June 5, 1962     J. M. WOLFSKILL     3,038,056
ELECTRICAL HEATING AND TEMPERATURE REGULATING APPARATUS
Filed June 21, 1957
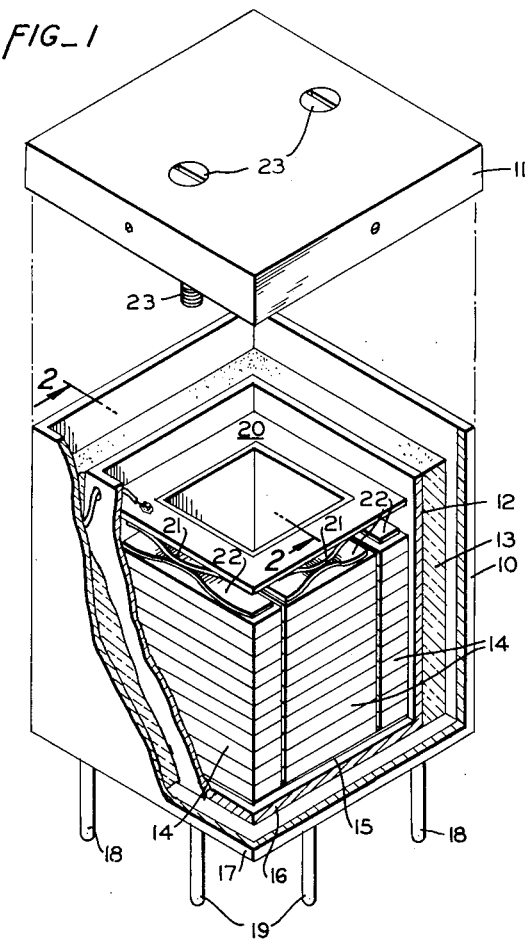
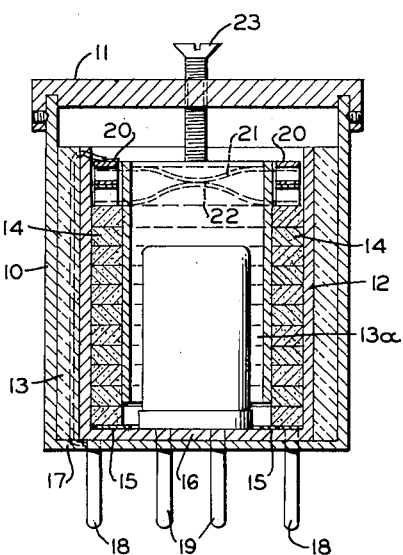
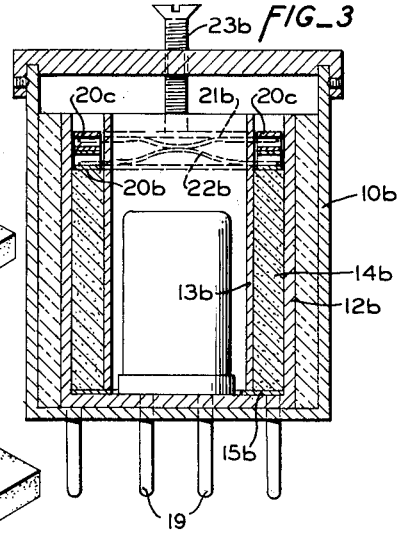
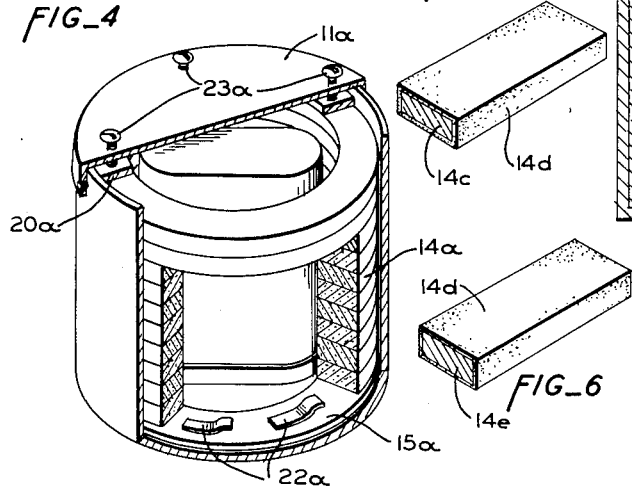
INVENTOR.
JOHN M. WOLFSKILL
BY
Allen and Chromy
*his* ATTORNEYS

United States Patent Office 3,038,056
Patented June 5, 1962

3,038,056
ELECTRICAL HEATING AND TEMPERATURE REGULATING APPARATUS
John M. Wolfskill, Erie, Pa., assignor, by mesne assignments, to Robertshaw-Fulton Controls Company, a corporation of Delaware
Filed June 21, 1957, Ser. No. 667,145
6 Claims. (Cl. 219—19)

This invention relates to a method and apparatus for maintaining the temperature of an object substantially constant.

An object of this invention is to provide an improved method and apparatus for maintaining the temperature of an object substantially constant within close limits.

Another object of this invention is to provide an improved electrical apparatus for maintaining the temperature of an object substantially constant within close limits without the use of conventional electrical make and break contact thermostats.

Still another object of this invention is to provide a temperature controlled housing for devices such as piezoelectric crystals to maintain high frequency stability therein.

A further object of this invention is to provide a housing for maintaining thermistors, transistors, diodes and the like at substantially constant temperature.

Another object of this invention is to provide an improved electrical temperature control device wherein the heat developed is increased or decreased without opening or closing the heating circuit.

Still another object of this invention is to provide a means of controlling the heat input to an oven in such a way that it is "full floating" or proportioning at all times and is anticipatory and self-regulating as to the amount of heat required to maintain the cavity in the oven or body therein at a substantially constant temperature.

A further object of this invention is to provide a temperature regulated oven or similar device having the temperature regulated cavity surrounded on the sides thereof by a circular, square or rectangular stack of carbon plates which are connected to a source of current supply to heat the cavity, the physical pressure on the stack being varied in accordance wtih temperature so as to vary the resistance of said stack.

Still a further object of this invention is to provide an improved temperature regulating apparatus in which the apparatus is adapted to be heated at least in part by pressure sensitive means through which the heating current is passed and which varies its resistance in accordance with pressure.

Other and further objects of this invention will be apparent to those skilled in the art to which it relates from the following specification and claims.

In the prior art of temperature controlled electrically heated ovens it has been the practice of using the bi-metallic type of thermostats, in which the bi-metal element flexes and opens or closes contacts which make or break the electrical heater circuit to the oven.

Such means of control always has several disadvantages. Frequently the contacts stick and the operation becomes erratic particularly after prolonged use of the unit. Furthermore, the flow of heat is nonuniform since the unit is either "on" or "off." When it is "on," the full flow of heat is supplied; when it is turned "off" no heat is supplied. In such a design for an oven, where close temperature regulation of the controlled oven cavity is required, it is necessary to introduce sufficient mass into it so that the heat flow cycles are averaged and heat is uniformly distributed, thereby providing a "flywheel" effect in the temperature regulation. Where size and weight are a factor, it is impossible to get good temperature control because of the large "slugs" of heat introduced when the thermostat is closed, and this is invariably reflected in temperature variations in the cavity or object controlled. Likewise, when no heat is supplied the temperature of the oven cavity or object drops abruptly unless sufficient mass can be used to smooth out the "on," "off" source of heat.

Furthermore, the life of the thermostat used in such applications is usually limited and the temperature at which the device is intended to operate, or to which it is adjusted, will usually change measurably with time because of pitting of the contacts caused by making and breaking of relatively large heating currents. It is particularly disadvantageous to use such a device where the heating current source is a direct current or where the source is derived from a transformer having substantial inductance such as will cause large arcs to develop across the thermostat contacts.

This invention circumvents these difficulties since the heating current furnished to the oven is not intermittently interrupted and the heat supplied to the oven is purely a function of the variable resistor element or elements and the pressure applied to the variable resistor elements.

Furthermore, because of the floating control which this invention provides, there is no radio interference such as that which results from the transients that are developed by make or break contacts. Also, since the area used on the carbon plates employed in the oven of this invention is high, the current density therein is extremely low even with relatively high power ovens and therefore no radio interference is encountered from this source.

An additional advantage is obtained from the fact that temperature regulation around a set temperature is almost independent of voltage applied to the device since the resistance of the carbon stacks employed automatically compensates for voltage variations.

These and other features of this invention will be set forth in further detail in the following specification, claims and drawing in which briefly:

FIGURE 1 is a partially exploded view which is also partially in section and shows an embodiment of this invention;

FIGURE 2 is a sectional view taken along the line 2—2 of FIGURE 1;

FIGURE 3 is a sectional view similar to FIGURE 2 and shows a modified form of this invention;

FIGURE 4 is a view partially in section of a further modification of this invention;

FIGURE 5 is a detail view showing ceramic material coated with resistance material adapted to be employed in this invention; and FIGURE 6 is a detail view of a metallic element coated with resistance material also adapted to be employed in accordance with this invention.

Referring to the drawing in detail, there is shown in FIGURE 1 a view partially in section of a temperature regulated oven embodying this invention. This oven comprises an outer housing 10 that is provided with a cover 11 and inside of which there is positioned an inner housing 12 so that a small space 13 exists between these housings and this space is filled with a suitable heat insulating material.

A plurality of stacks of carbon plates or slabs 14 is positioned inside of the inner housing 13 adjacent to the inner wall thereof so that these stacks of carbon plates 14 surround the walls 13a of the temperature controlled cavity. The stacks 14 rest upon the plate 15 of electrically conductive material and this plate in turn rests upon the bottom 16 of the inner housing 13 which is supported on the bottom 17 of the outside housing 10. Two pairs of plug-in terminals 18 and 19 are fixed to the bottom 17 and project therefrom so that electrical circuits may be connected to the carbon stacks 14 and to the apparatus positioned in the temperature controlled cavity 13a when desired.

The tops of the carbon stacks 14 are engaged by a plurality of spring units and each unit consists of a bi-metal spring member 22, the central part of which is bowed upward so that this part may be welded to the downwardly bowed central part of the bi-metal spring 21. Thus, in each spring unit the upwardly bowed part of the spring 22 is welded to the downwardly bowed part of the spring 21 so that the low temperature expansion sides thereof face each other and the high temperature expansion side of the member 22 engages the carbon stacks 14, whereas the high temperature expansion side of the member 21 engages the bottom of the metal plate 20 which is accordingly supported by these bi-metal spring members.

The cover 11 fits into the top of the housing 10 and is adapted to rest on the top of the inner housing 12. Suitable machine screws may be used for attaching the cover 11 in the housing 10 so that the machine screws 23 that are threaded into suitable holes in the cover 11 may be employed for applying the desired initial pressure upon the top plate 20. Accordingly, an initial pressure may be applied to the bi-metal springs and to the stacks of carbon plates or slabs for the purpose described hereinafter.

When this device is placed into use a suitable electric current is passed through the carbon stacks 14 by connecting a source of current supply to the plug terminals 18, one of which is connected to the metal plate 15 and the other of which is connected to the metal plate 20. Accordingly the desired electric current passes through the plate 15, the carbon stacks 14, the bi-metal spring members 21—22 and the plate 20.

The carbon plates themselves serve as the heat source when current is passed through them and it is therefore not necessary to employ resistance wires to provide the heat source, although such wires may be used in addition to the carbon stacks and in such cases the resistance wire may be connected in series with one or more of the carbon stacks. Variation in the resistance of the stack or stacks of carbon plates, is obtained by means of bimetallic spring elements 21—22 previously described.

The two bi-metallic elements 21—22 are welded with the low expansion sides together and with the high expansion sides on the outside so that the height of the bi-metallic unit decreases with rise in temperature. When a group of these bi-metal spring units is used around the periphery of either a square or rectangular cavity, to keep the carbon plates under a fixed initial pressure at a given temperature, the pressure on the carbon plates will vary with variations in temperature, the pressure decreasing with temperature rise. Therefore, as the temperature rises the pressure decreases and the resistance of the carbon stack increases even though carbon has a negative temperature-resistance coefficient. With a fixed voltage across the carbon stack or stacks, the current therethrough will decrease and the heat supplied to the cavity will also decrease. Accordingly, at some point, for a minimum initial pressure on the carbon stack, a point of equilibrium is reached where the carbon stack electrical resistance is such that the heat input to the oven is exactly equal to the heat loss therefrom. When this equilibrium is established the oven temperature will be regulated at its pre-set temperature and will immediately anticipate any change of heat loss which has to be compensated for by heat input. The bi-metallic spring elements will then bend in the opposite direction resulting in greater pressure on the carbon stacks thereby lowering the resistance and consequently increasing current flow or power input to the oven.

This device is therefore completely self-regulating once the pressure on the entire stack of carbon plates plus the bi-metallic elements is set. To change the setting or operating temperature of the device, it is simply necessary to change the pressure on the stack assembly by means of the screws 23 and this will cause it to regulate at another temperature.

Elements other than carbon plates or blanks may be used in accordance with this invention, for example, powdered material such as powdered graphite or pressure sensitive resistor powder such as manufactured by the Celab Electronic Products of Sacramento, California, and sold by it under the name "Celab" pressure sensitive material. This powder which is high pressure sensitive is also suitable for use in this invention as will be described hereinafter.

The resistance heating unit 14 described in the preceding paragraphs was made up of stacks of carbon plates; however, other materials and also other configurations of carbon plates may be employed. For example, instead of employing a plurality of stacks, a single stack 14a in which the plates are made of annular or ring-shape, such as shown in FIGURE 4, may be employed. In this embodiment of the invention a plurality of single bi-metal spring members 22a are positioned on the bottom plate 15a, with one end of each spring member attached to said plate, and the stack of ring-shape resistance elements 14a is supported thereby. These bi-metallic members 22a are responsive to the temperature variations in the housing and therefore vary the electric current through the stack of carbon rings or ring-shape elements by varying the pressure on said elements. Screws 23a are positioned in the top 11a of the housing for the purpose of adjusting the pressure on the top ring 20a so that the initial current flowing between the rings 15a and 20a, through bi-metallic members 22a and through the stack of carbon rings may be adjusted. Furthermore, these screws may be employed for adjusting the temperature at which the unit is to be maintained by adjusting the initial resistance of the carbon stack. In other words, this unit is quite flexible in that any one of numerous temperatures may be selected, and once the screws are adjusted to the proper pressure, the unit will maintain such a temperature.

Instead of employing a stack or stacks of carbon plates as the resistance heating means, it is also practical to employ a stack consisting of carbon pieces or granules or the granular or powdered material sold under the name of "Celab," referred to previously herein. When granular or powdered material is employed, it is essential to provide a suitable container therefor, and in such cases, the powdered material may be placed between the inner housing 13b and the side walls of the housing 12b, as shown in FIGURE 3, since the walls of these housings are made of insulating material. The powdered or granular material 14b rests on the plate 15b and supports on the top thereof a plate 20b, which is positioned between this powdered material and the bi-metal spring members 21b and 22b. In this way these bi-metal spring members can exert pressure over the entire top of the resistance column of the granular or powdered material. A plate 20c is positioned on top of the spring members and this plate is connected to one side of a source of electric current while the bottom plate 15b is connected to the other side of this source. Suitable screws 23b are employed for manually adjusting the pressure on the powdered column for setting the temperature to be maintained in the device.

Other variations may be made in this invention; for example, it is not necessary to employ solid carbon plates or slabs for the resistance heating elements. These elements may take the form of ceramic plates or slabs 14c, shown in FIGURE 5, provided with a covering 14d of carbon, graphite or silicon carbide, that is, "Carborundum" if resistance heating elements having greater strength and increased temperature sensitivity are desired. These materials may be applied to the ceramic plates or slabs by firing the carbon or silicon carbide thereon or by cementing these materials in powdered form to surfaces of the ceramic. Furthermore, the ceramic plates or slabs may be impregnated with powdered or granular carbon, "Carborundum" or "Celab." In addition to the above, plates or slabs 14e, shown in FIGURE 6, made of steel or other metals and coated with these materials 14d which are processed to have a relatively high electrical resistance as compared to the electrical resistance of the steel or other metal, may also be employed.

While I have shown a preferred embodiment of the invention it will be understood that the invention is capable of variation and modification from the form shown so that its scope should be limited only by the scope of the claims appended hereto.

What I claim is:

1. Temperature regulated apparatus for maintaining the temperature of devices such as quartz crystals or similar units within close tolerances, comprising a housing having side walls, top and bottom and also having a temperature controlled cavity therein to receive a member to be temperature controlled, electrical resistance heating means responsive to variations in pressure, said heating means surrounding said cavity, connections for connecting said heating means to a source of current supply for continuously supplying electric current thereto, and temperature responsive means connected in series with said heating means, said temperature responsive means being positioned in said cavity adjacent one end of said heating means and having means engaging said end of said heating means for applying pressure thereto, said temperature responsive means being adapted to expand when the temperature thereof decreases so as to increase the pressure on said heating means whereby the electric current through said heating means is increased and the temperature thereof is caused to rise.

2. Temperature regulated apparatus for maintaining the temperature of devices such as quartz crystals or similar units within close tolerances, comprising a housing having side walls, top and bottom and also having a temperature controlled cavity therein to receive a member to be temperature controlled, electrically heated resistance means forming a hollow stack adjacent to and surrounding said cavity, said hollow stack comprising a plurality of electrically conductive elements supported upon each other, a pair of plates of electrically conductive material, one of said plates positioned on the top and the other of said plates positioned on the bottom of said hollow stack, temperature responsive spring means made of bimetallic temperature responsive material positioned between one of said plates and said hollow stack of elements for increasing the pressure, on said stack of elements when the temperature of said spring means decreases, and adjustable means supported by said housing and engaging one of said plates for applying pressure to said temperature responsive spring means and said hollow stack of elements, said adjustable means being adapted to adjust said pressure initially to determine the temperature at which said cavity is to be maintained.

3. Temperature regulated apparatus for maintaining the temperature of devices such as quartz crystals or similar units within close tolerances, comprising a housing having side walls, top and bottom and also having a temperature controlled cavity therein to receive a member to be temperature controlled, electrically heated resistance means forming a hollow stack adjacent to and surrounding said cavity, said hollow stack comprising a plurality of electrically conductive elements supported upon each other so that the contact resistance between adjacent elements forms a large proportion of the electrical resistance of said stack, a pair of plates of electrically conductive material, one of said plates positioned on the top and the other of said plates positioned on the bottom of said hollow stack, temperature responsive spring means positioned between one of said plates and said hollow stack, said spring means comprising a pair of bimetallic leaf springs joined together so that the free ends thereof move toward each other when said spring means is heated, and adjustable means supported by said housing and engaging one of said plates for applying pressure to said temperature responsive spring means and said hollow stack of elements, said adjustable means being adapted to adjust said pressure initially to determine the temperature at which said cavity is to be maintained.

4. Temperature regulated apparatus for maintaining the temperature of devices such as quartz crystals or similar units within close tolerances, comprising a housing having side walls, top and bottom and also having a temperature controlled cavity therein to receive a member to be temperature controlled, electrically heated resistance means forming a hollow stack adjacent to and surrounding said cavity so that heat therefrom is radiated into said cavity from all sides thereof, said hollow stack comprising a plurality of electrically conductive narrow elements supported upon each other so that the contact resistance between adjacent elements forms a large proportion of the electrical resistance of said stack, a pair of plates of electrically conductive material, one of said plates positioned on the top and the other of said plates positioned on the bottom of said hollow stack, temperature responsive spring means made of bimetallic temperature responsive material positioned between one of said plates and said hollow stack, and adjustable means supported by said housing and engaging one of said plates for applying pressure to said temperature responsive spring means and said hollow stack of elements, said adjustable means being adapted to adjust said pressure initially to determine the temperature at which said cavity is to be maintained.

5. Temperature regulating apparatus for maintaining the temperatures of devices such as quartz crystals or similar units within close tolerances, comprising a housing having side walls, a top and a bottom and also having a temperature controlled cavity therein to receive a member to be temperature controlled, electrically heated resistance means forming a hollow stack adjacent to said cavity, said hollow stack comprising a plurality of electrically conductive elements supported upon each other so that the pressure responsive contact resistance between adjacent elements forms a large proportion of the electrical resistance of said stack, a pair of plates of electrically conductive material, one of said plates positioned at the top and the other of said plates positioned at the bottom of said hollow stack for conducting electricity thereto, and temperature responsive means including spring means for increasing the pressure on said stack of elements when the temperature of said temperature responsive means decreases.

6. Temperature regulating apparatus for maintaining the temperature of devices such as quartz crystals or the like at a substantially constant temperature comprising a rigid thermally insulated housing, an electrical resistance heating assembly having electrical resistance characteristics variable in response to variations in pressure exerted on said assembly, said assembly being disposed within said housing to define an internal cavity adapted to receive a device to be maintained at a substantially constant temperature, means for connecting said heating assembly to an electric power source to continuously supply current to said heating assembly, thermally responsive spring means having a spring characteristic variable in response to the temperature to which said spring means is exposed, and means mounting said spring means in said housing with said spring means exposed to the temperature within said cavity to exert a pressure on said heating assembly variable in response to variations in temperature within said cavity in a direction maintaining said cavity at a selected substantially constant temperature.

References Cited in the file of this patent

UNITED STATES PATENTS

| | | |
|---|---|---|
| 1,663,810 | Morse | Mar. 27, 1928 |
| 2,096,571 | Williams | Oct. 19, 1937 |
| 2,524,886 | Colander et al. | Oct. 10, 1950 |
| 2,790,884 | Gilbert | Apr. 30, 1957 |

OTHER REFERENCES

Industrial Heating: Vol. XXIII, No. 7, 1956; pp. 1460, 1462, 1464.